US012624825B2

(12) United States Patent
Rasmussen

(10) Patent No.: US 12,624,825 B2
(45) Date of Patent: May 12, 2026

(54) DRAINAGE FOR LIGHT FIXTURE WITH MOVABLE LENS

(71) Applicant: HARMAN PROFESSIONAL DENMARK APS, Aarhus (DK)

(72) Inventor: Niels Jørgen Rasmussen, Egga (DK)

(73) Assignee: Harman Professional Denmark APS, Aarhus N (DK)

( * ) Notice: Subject to any disclaimer, the term of this patent is extended or adjusted under 35 U.S.C. 154(b) by 0 days.

(21) Appl. No.: 19/186,127

(22) Filed: Apr. 22, 2025

(65) Prior Publication Data

US 2025/0362010 A1 Nov. 27, 2025

(30) Foreign Application Priority Data

May 23, 2024 (EP) .................................... 24177540

(51) Int. Cl.

| | |
|---|---|
| ***F21V 31/03*** | (2006.01) |
| ***F21V 14/06*** | (2006.01) |
| ***F21V 15/01*** | (2006.01) |
| ***F21V 31/00*** | (2006.01) |

(52) U.S. Cl.

CPC .............. *F21V 31/03* (2013.01); *F21V 14/06* (2013.01); *F21V 15/01* (2013.01); *F21V 31/005* (2013.01)

(58) Field of Classification Search

CPC ........ F21V 31/03; F21V 31/005; F21V 14/06; F21V 15/01; F21V 21/30; F21V 19/02; F21S 8/081

See application file for complete search history.

(56) References Cited

U.S. PATENT DOCUMENTS

| | | | | |
|---|---|---|---|---|
| 9,605,813 | B2 | 3/2017 | Collias | |
| 2013/0208481 | A1* | 8/2013 | Sooferian | F21V 14/02 362/280 |
| 2014/0313744 | A1* | 10/2014 | Collias | F21V 5/045 362/311.02 |
| 2021/0108787 | A1* | 4/2021 | Erdener | F21V 21/26 |
| 2024/0093863 | A1 | 3/2024 | Rasmussen | |
| 2025/0075888 | A1* | 3/2025 | You | F21V 17/06 |

FOREIGN PATENT DOCUMENTS

| | | | | | |
|---|---|---|---|---|---|
| CN | 107023801 | A | | 8/2017 | |
| CN | 107654966 | A | * | 2/2018 | F21V 17/104 |
| CN | 108006483 | A | | 5/2018 | |
| CN | 210291700 | U | | 4/2020 | |
| CN | 214038062 | U | * | 8/2021 | F21V 21/30 |

* cited by examiner

*Primary Examiner* — Erin Kryukova
(74) *Attorney, Agent, or Firm* — Artegis Law Group, LLP

(57) ABSTRACT

A light fixture is provided, comprising a light fixture housing with a housing sidewall extending circumferentially around a movable lens. The light fixture housing forms an inner space that includes at least one light source for emitting light through the movable lens. The movable lens is arranged on a light output side of the light fixture housing and is movable along the housing sidewall relative to the at least one light source. A sealing element is positioned between the housing sidewall and the movable lens, in order to seal the inner space from the exterior environment outside the light fixture. The movable lens defines a cavity in the housing on the light output side. This cavity is at least partially bounded by the movable lens and the sealing element on its inner side, while remaining open to the exterior on the light output side.

20 Claims, 8 Drawing Sheets

DRAINAGE FOR LIGHT FIXTURE WITH MOVABLE LENS

CROSS-REFERENCE TO RELATED APPLICATIONS

This application claims priority benefit of Application No. EP 24177540.2, titled "DRAINAGE FOR LIGHT FIXTURE WITH MOVABLE LENS," and filed May 23, 2024. The subject matter of this related application is hereby incorporated by reference herein in its entirety.

DETAILED DESCRIPTION

Technical Field

Various examples of the disclosure generally relate to the field of light fixtures. Various examples of the disclosure specifically relate to drainage elements in light fixture housings, more specifically to drainage elements in outdoor light fixtures with moving front lens.

BACKGROUND

Light fixtures are exposed to various environmental conditions, including rain and moisture. For example, in some light fixtures, the front lens may be movable, for example to provide zoom capabilities. However, the movement of the front lens can create a bucket or cavity in the fixture housing, in which fluid can accumulate.

Accumulated fluid can cover the front lens, which degrades the optical properties and results in reduced or distorted light output. Additionally, the accumulated water increases the risk of ingress into the interior of the light fixture, which may damage internal light fixture components.

Existing solutions to address fluid accumulation add a fixed transparent glass plate in front of the movable lens to prevent formation of a bucket. However, this additional glass reduces light output, affects the aesthetics of the fixture, and can visibly accumulate condensation or residue. Other existing solutions rely on monitoring and selective drainage movements. For example, fixtures may include sensors to detect rain or water accumulation, and execute a programmed drainage sequence after a certain time or water level is reached. However, this approach depends on power to the fixture and the proper functioning of the sensors and control system. The drainage sequence may also briefly interrupt normal operation of the lighting.

SUMMARY

Accordingly, there is a need for improved drainage techniques for light fixtures, which can reliably remove accumulated water without impacting normal operation or optical performance of the fixture.

This need is met by the features of the independent claims. The features of the dependent claims define further advantageous examples.

In the following, the solution according to the present disclosure will be described with regard to light fixture and corresponding light fixture housings, generally referred to as enclosures, including at least one drainage element, wherein it is to be understood that the disclosed techniques can be applied to any kind of enclosure or housing comprising a sealed inner space and a cavity formed in the outer surface of the housing or enclosure. For example, a housing with any kind of cavity defined by a movable or a non-movable outer optical element, such as a lens, may be improved by the described techniques.

A light fixture is provided. The light fixture comprises a light fixture housing comprising at least one light source. A housing sidewall of the housing extends circumferentially around a movable lens, in general a movable outer optical element, of the light fixture. In other words, the light fixture housing defines an inner space including the at least one light source for emitting light through the movable lens to the exterior of the light fixture.

In various examples, the light fixture housing comprises further optical and/or electrical and/or mechanical light fixture components in the inner space. The light fixture further includes the movable lens, which can be moved, at least partly, within the housing. It is to be understood, that not only strictly axial movement, but other movements of the lens are possible. The housing comprises a housing sidewall, which at least partly surrounds the movable lens. The movable lens is movable along the housing sidewall. In other words, the light fixture comprises a housing with a circumferential sidewall around the perimeter of the movable lens, wherein the movable lens is at least axially movable along the inner surface of the housing sidewall. Both the lens and the housing sidewall may define the same or different central optical and/or mechanical symmetry axis, along the movable lens is transitionally movable. It is to be understood that additionally any arbitrary rotational or non-linear movement can be comprised in the movement of the movable lens. The light source emits light, which is projected forward in a light output direction through the movable lens. The movable lens is arranged on the light output side, in other words as outer or outmost optical element in the light path on the light output side of the light fixture, and therefore exposed to the exterior environment on the light output side. Particularly the lens forms part of the outer surface of the light fixture. On the light output side, which can also be referred to as the light emitting side, the lens may be exposed to moisture or fluid present in the exterior environment. The movable lens is further exposed to the sealed inner space on the inner, i.e. the light receiving side or surface, of the movable lens.

In various examples, the movable lens is arranged at least partly within the housing sidewall, as last or outmost optical element of the light fixture along the optical path, on the light output side of the light fixture housing, and is linearly and/or non-linearly movable and/or rotatable along the housing sidewall relative to the at least one light source.

The movable lens is arranged on the outside surface of the housing, such that it may be part of the outer surface of the light fixture, when light is projected forward through the movable lens by the light fixture.

In various examples, the movement of the movable lens can be described as translation, or axially along the housing sidewall along a longitudinal axis (of the lens movement, and/or the housing sidewall). The movable lens thereby changes its axial position or distance relative to the light source(s). The longitudinal axis may be along the main emission direction of the light fixture. The housing sidewall may define the longitudinal axis for axial movement of the movable lens.

In various examples, the movable lens may be situated on the light emission side of the housing enclosure and configured for movement at least partly along the circumferential sidewall, allowing its position to be adjusted in relation to the at least one light source, for example using one or more of support elements, such as rails, and actuators, which may be operably connected to the movable lens. It would be possible that the lens is additionally non-linearly moved or rotated in relation to the at least one light source, wherein the lens and the surrounding housing sidewall define a cavity.

A sealing element is positioned between the housing sidewall and the movable lens and liquid-tightly connected thereto, such that the sealing element seals the inner space from an exterior outside the light fixture. The sealing element forms part of the cavity, or the surface of the cavity. In particular, the sealing element (for example in form of an elastic tube or bellow around the movable lens) can be connected between the housing sidewall and the movable lens. The sealing element prevents the ingress of fluid or moisture (or dust) into the inner space of the light fixture between the sidewall and the lens. In other words, the sealing element is arranged between the circumferential sidewall and the movable lens to create a seal that isolates the internal cavity from the external environment, and thereby and bounds at least a part of a cavity in the outer surface of the light fixture housing, which can also be referred to as concave recess, or bucket, in which the lens is positioned and which is exposed to the external environment, such that fluids or moisture can accumulate therein.

In various examples, the movable lens at least partly bounds, i.e. defines a boundary surface of, the cavity in the light fixture housing. The cavity is open to the environment surrounding the light fixture, in other words exposed to the light fixture exterior. In various examples, movement of the movable lens further defines or forms the cavity in the housing open on the light output side. The cavity is at least partially bounded by the movable lens and the sealing element, such that liquid can accumulate on the movable lens. In other words, the movable lens is arranged within the cavity, in at least some positions of the movable lens. The cavity can be at least partially bounded by the sealing element on a circumferential inner surface of the cavity. On an inner side of the cavity, in other words inside the cavity, the cavity has an inner surface, which is partly formed be the lens and/or the sealing element, and in some examples also an inner surface of the housing sidewall. The cavity is open to the exterior on the light output side. The cavity has a bottom surface, which lies in direction towards the at least one light source, and which is at least partly formed by the movable lens.

In various examples, the movable lens is movable between an outer or more extended position (front position) and an inner, more drawn back, position (back position), and various selective and/or variable positions in between. When the movable lens changes position from a position further away (front position) to a position closer to the light sources (back position), it forms and/or increases a cavity within the housing sidewall, which is open to the light output side. This cavity is partially bounded by the movable lens and the sealing element on the inner cavity surface, while the cavity is open to the exterior from the light output side. In other words, adjusting the position of the movable lens results in the defining of the cavity within the housing enclosure, which forms a recess or bucket in the light fixture housing. The cavity is formed in such a way, that liquid from the external environment can accumulate within the cavity, which is to be removed or evacuated from the cavity.

At least one drainage element, guiding or channeling liquid out of the cavity, extends from the cavity to the external environment, in order to drain accumulated liquid from the cavity. The at least one drainage element may comprise an inner space, in other words a channel, in which fluid flows and is led from one end of the drainage element to the other end of the drainage element. In particular, the at least one drainage element extends (optionally at least partly) through the light fixture housing, in particular through the housing sidewall, for channeling the accumulated liquid from the cavity to the exterior. The at least one drainage element may extend through the surface of the cavity, i.e. the surface inside the cavity. The at least one drainage element may define an opening in the surface of the cavity. In other words, the light fixture includes one or more drainage elements (e.g., in the form of tubes of flow channels) that connect the cavity to the exterior outside of the cavity, i.e. to the exterior of the light fixture, through the light fixture housing. These drainage elements allow liquid that accumulates in the cavity to flow out of the cavity and/or out of the light fixture without the need to tilt the cavity. In some examples, the at least one drainage element may define a drainage flow direction that essentially extends backwards, i.e. along the longitudinal lens axis towards the light sources, and not along the emission direction of the light source.

A corresponding light fixture housing or enclosure, or a component or part of a light fixture housing or enclosure, which may also be referred to as drainage system, is provided, which may be improved by a drainage element according to any one or any combination of features as described for the light fixture.

The disclosed light fixtures may be operated by movement of the movable lens, and/or movement of the light fixture, in particular the head of a moving head light fixture, to a tilted orientation, such that liquid accumulated in the cavity is removed through the drainage element.

It will be appreciated that also more than one drainage elements, in particular an arbitrary number of draining elements at a plurality of positions within the lens cavity can be included in the light fixture, positioned at different locations around the circumference of the housing sidewall. In various examples, two drainage elements may be included in opposite directions of the cavity. In various examples, four drainage elements may be included arranged around the bottom perimeter of the cavity. This arrangement ensures that accumulated liquid can be effectively drained from the cavity, regardless of the specific tilted orientations of the light fixture.

In operation, when the light fixture is moved or oriented in a way that causes liquid to accumulate in the cavity formed by the movable lens and the sealing element, the at least one drainage element provides a path for the liquid out from the cavity through the light fixture housing. Once the liquid enters the drainage inlet, it flows through the drainage tube(s) that extend through the housing sidewall. The drainage tube may be positioned to ensure that the liquid is directed away towards the sidewall or a bottom wall within the light fixture.

By incorporating multiple drainage elements at different positions around the circumference of the housing sidewall, the light fixture can efficiently remove accumulated liquid from the cavity, regardless of the specific tilted orientation. This redundancy ensures that the liquid will always find a path to at least one of the drainage inlets, minimizing the risk of liquid buildup or overflow within the cavity.

The disclosed light fixture provides a reliable and efficient means of managing and removing accumulated liquid from the cavity formed by the movable lens and its corresponding sealing element. This feature enhances the overall durability and performance of the light fixture, particularly in applications where the fixture may be exposed to moisture or other liquids.

It is to be understood that the features mentioned above and features yet to be explained below can be used not only in the respective combinations indicated, but also in other combinations or in isolation, without departing from the scope of the present disclosure. In particular, the features mentioned above and those yet to be explained below may be used not only in the respective combinations indicated, but also in other combinations or in isolation without departing from the scope of the disclosure.

Therefore, the above summary is merely intended to give a short overview over some features of some embodiments and implementations and is not to be construed as limiting. Other embodiments may comprise other features than the ones explained above.

BRIEF DESCRIPTION OF THE DRAWINGS

These and other objects of this disclosure will be appreciated and understood by those skilled in the art from the detailed description of the preferred embodiments and the following drawings in which like reference numerals refer to like elements.

DETAILED DESCRIPTION OF EXAMPLES

Figure 1:
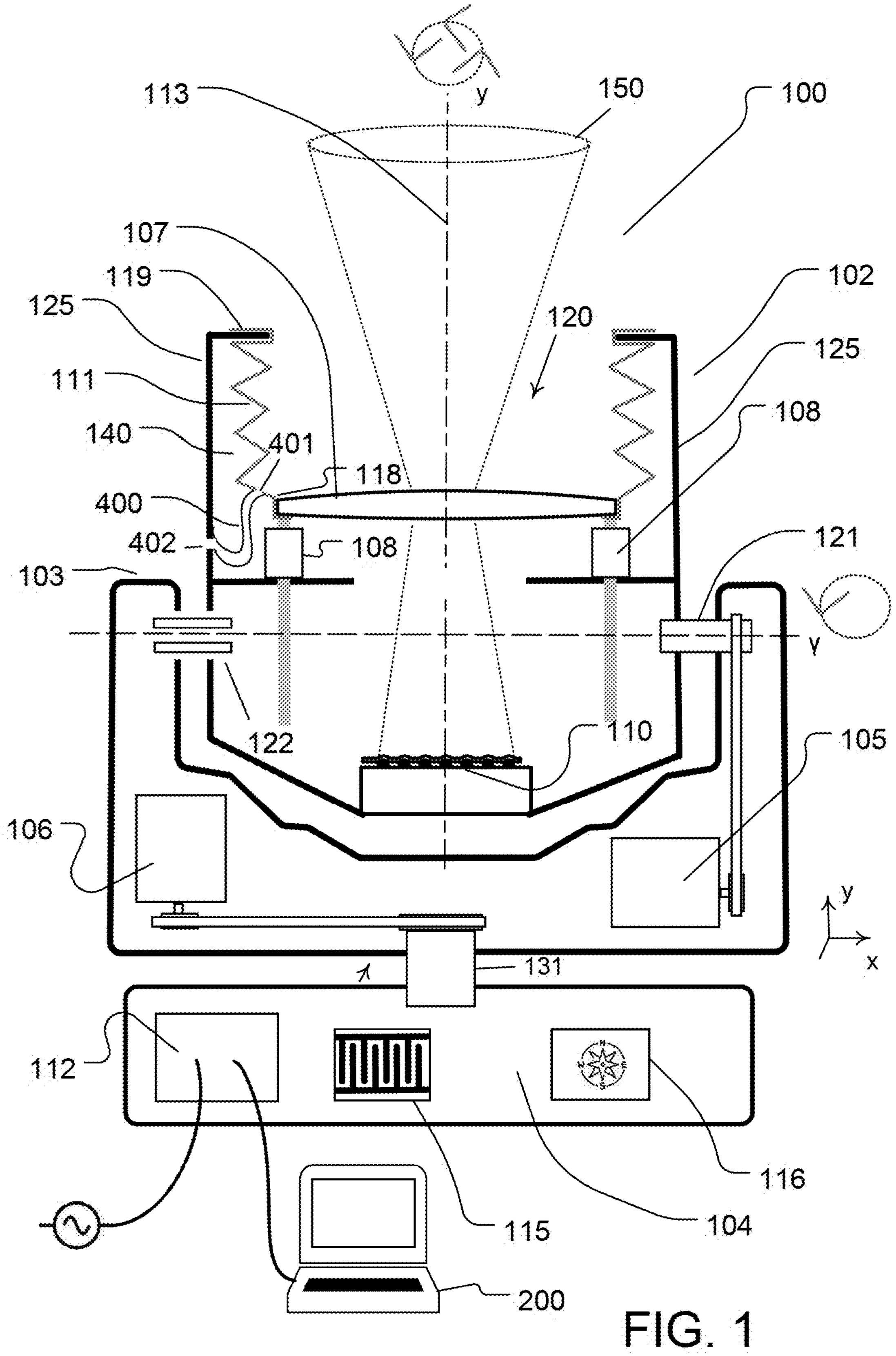
FIG. 1 schematically illustrates a cross-sectional view of a light fixture including a sealing element attached to the housing on the light output side of a movable lens and a drainage element, according to various embodiments.

In the following, embodiments of the disclosure will be described in detail with reference to the accompanying drawings. It should be understood that the following description of embodiments is not to be taken in a limiting sense. The scope of the disclosure is not intended to be limited by the embodiments described hereinafter or by the drawings, which are taken to be illustrative examples of the general inventive concept. The features of the various embodiments may be combined with each other, unless specifically noted otherwise.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling.

In many industrial lighting applications ingress protection is applied to improve robustness against water and particles, such as dust. Normally this causes increased costs and/or complexity, lower serviceability etc. When the protection is applied to joints between elements arranged for mutual movement, the solution often includes special sealings and hydrophobic grease where the drawback is higher friction and noise, and/or alternatively lower lighting quality.

In entertainment and architectural lighting, light fixtures, such as moving head light fixtures, are often used outdoor with the risk of rain showers and/or other sources of moisture. Therefore, the product should either be placed safely under a roof, or it should be ingress protected with IP class 44 or higher. An important section of a moving head light fixture is the movement of the lens relative to the light source(s) arranged in the head. Traditionally an extra window is arranged in front of the lens at a distance to allow movement of the lens relative to the light source(s) without collision with the window. The window can protect the lens and decrease the risk of moisture ingress into the head. However, the window may cause internal reflections, and fingerprints on the window may change the output light. The window itself may additionally decrease the output from the light source(s) and may add weight to the moving head light fixture. Accordingly, a need exists to overcome the problems mentioned above and to provide a light fixture with a high light output with minimum internal reflections even when used outdoor in an environment where the light fixture is exposed to rain or where other objects could be present on the lens which is not protected by a closing window.

Hereinafter, techniques will be described that relate to drainage techniques for housings or housings of electronic equipment, specifically light fixtures, for example outdoor light fixtures. Various aspects of the disclosure are described with regard to a moving head light fixture, however it is to be understood that any light fixture can be improved by the disclosed techniques, which for example forms a cavity or bucket by a moving outer optical element, such as a moving lens. A moving head light fixture comprises a head, a yoke, and a base. The head houses various electronic and optical equipment, such as light sources, light shaping components, lenses, sensors, control electronics, and possibly cooling equipment. These components require protection from environmental influences such as moisture, dust, or external mechanical impacts, making it essential for the head to form a sealed inner space in which the components are housed. The yoke provides a connection between the head and the base, enabling the head to rotate and move in different directions.

FIGS. 1 to 8 illustrate cross-sectional views of a light fixture 100 in the form of a moving head light fixture, according to various embodiments.

FIG. 1 schematically illustrates a cross-sectional view of the light fixture 100 including a drainage element 400 attached to the housing on the light output side of a movable lens 107, according to various embodiments.

The light fixture 100 comprises, without limitation, a head 102, a yoke 103, and a base 104. Two first joints 121, 122 are arranged between the head 102 and the yoke 103, and a second joint 131 is arranged between the base 104 and the yoke 103 to provide the head 102 being rotatably connected to the yoke 103, and a yoke 103 being rotatably connected to the base 104. The light fixture, here the head 102, comprises an inner space 140, also referred to as compartment 140, which houses one or a plurality of light sources 110 as shown in FIGS. 1 to 8. The at least one light source emits light along a main light emission direction shown in FIG. 2 with arrow A, wherein arrow A is parallel to middle axis 113 of the head, which also is the longitudinal axis with regard to the housing sidewall 125 and the axial movement of movable lens 107.

A lens 107 is movably arranged relative to the light source 110. The lens 107 is arranged substantially perpendicular to the at least one light source 110, and movement of the lens 107 relative to the light source 110 is a substantially linear movement in a direction away from the at least one light source 110 or towards the at least one light source 110, as indicated by the arrow B. The lens can be a single lens, but it is also possible, that the lens 107 is a lens group. Accordingly, the lens is moved in direction of the main light emission direction and is located substantially perpendicular to the main light emission direction. The movement of the lens 107 adapts a shape of a light beam 150 emitted by the light fixture in direction of the main light emission direction. In general, any outmost optical element of light fixture that may or may not be movable, and forms a cavity in the outer surface, may be protected by the disclosed techniques.

Figure 2:
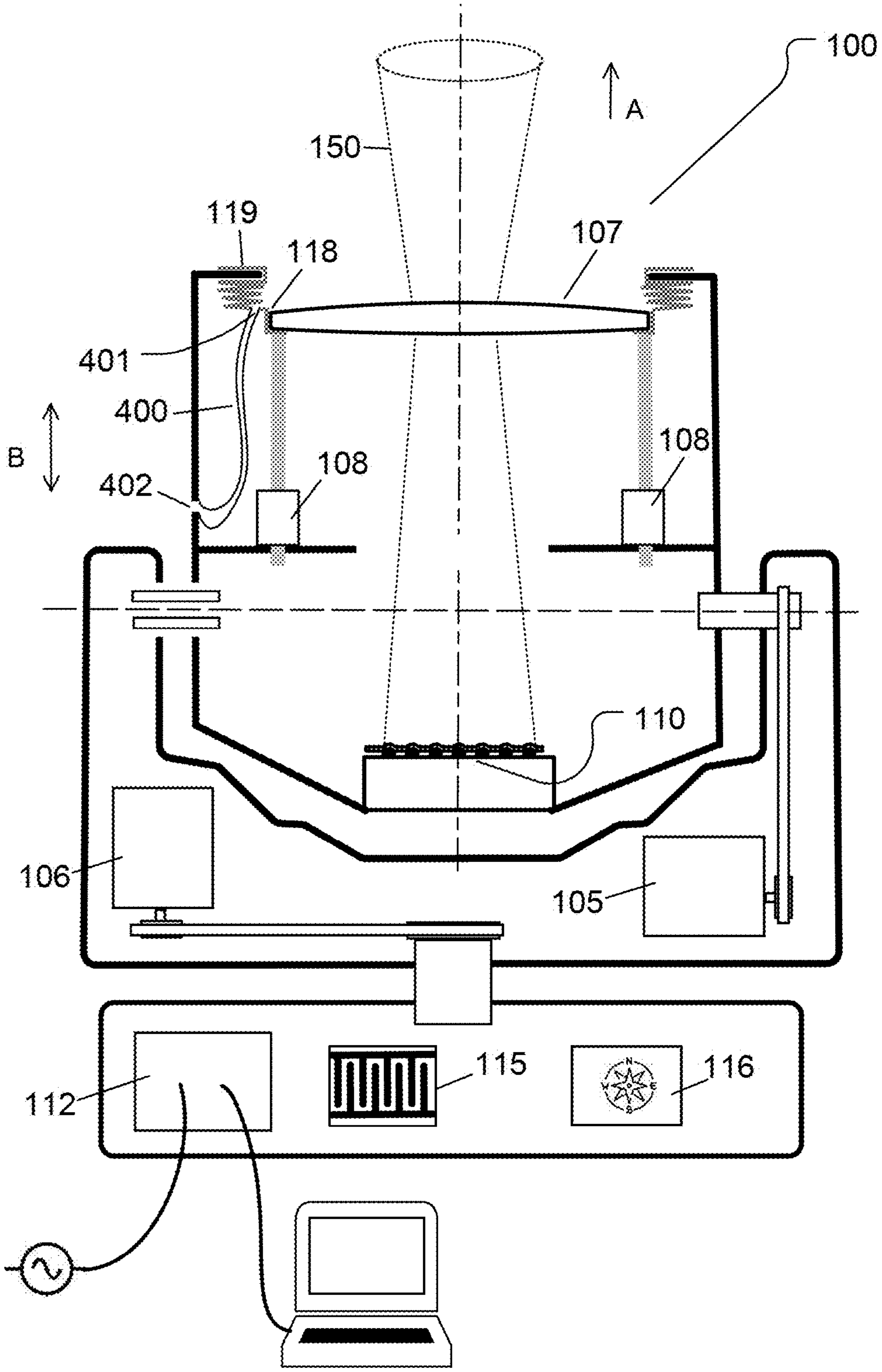
FIG. 2 schematically illustrates a cross-sectional view of the light fixture of FIG. 1, wherein the movable lens is arranged in a front position, according to various embodiments.

FIG. 2 schematically illustrates a cross-sectional view of the light fixture 100 of FIG. 1, wherein the movable lens 107 is moved to a front position, according to various embodiments.

Therefore, in various examples, the housing of the light fixture comprises a housing sidewall 125 extending circumferentially around a movable lens 107, the light fixture housing forming an inner space 140 including at least one light source 110 for emitting light through the movable lens 107. The movable lens 107 arranged on a light output side of the light fixture housing, as last optical element on the light path of light from the light source 110 to the exterior of the light fixture, and movable along the housing sidewall 125 relative to the at least one light source 110.

The light fixture 100 further comprises a sealing element 111, sealing the space between the housing sidewall and the movable lens, such that the sealing element seals the inner space 140 from an exterior outside the light fixture 100.

The sealing element 111 may be realized and also referred to, for example, as a deformable bellow or membrane 111 having a tubular shape extending from a first end 118 to a second end 119. Thus, the sealing element 111 forms a cavity 120, also referred to as recess or bucket, at a front end of the light fixture where the light beam exits the light fixture. The membrane 111 is at the first end 118 attached to the lens 107 and is at the second end 119 attached to an upper part of a sidewall 125 of the head 102. The sidewall 125 extends circumferentially around the lens 107, and the lens 107 moves relative to the sidewall 125. In FIG. 2 the deformable membrane 111 is in a compressed configuration, whereas in FIG. 1, the deformable membrane 111 is in an extended configuration.

Because the membrane 111 is attached to the lens 107 at the first end 118, the lens 107 closes the head 102 at the end at which the light exits the light fixture and allows unhindered passage for light beams from the at least one light source 110 in direction of the main light emission direction. In the situation shown in FIGS. 1 to 3, the main light emission direction is a vertical direction, but it is clear that the main light emission direction depends on the orientation of the head 102 relative to the yoke which can rotate around axis x, the tilt rotation, and the orientation of the yoke 103 relative to the base 104, the pan rotation.

When moving the lens 107 relative to the at least one light source 110, the membrane 111 is compressed and expanded with the movement of the lens 107 because the membrane 111 at the first end 118 is attached to the lens 107 and the membrane 111 at the second end 119 is attached to a sidewall 125 of the head. The lens 107 is moved back and forth in front of the light sources 110, i.e. between a front position and a back position and variably in between, by use of a plurality of motors 108, where only two motors are visible. In the illustrated embodiments, the motors 108 are linear motors in the form of spindle motors. It is also possible that other concepts such as a gear or belt drive on linear guides are used. The two visible motors 108 are oppositely arranged relative to a center axis y extending through the center of the light source to facilitate linear movement of the lens 107.

As can be seen in FIGS. 1 to 8, movement of the movable lens 107 forms a cavity 120 in the housing on the light output side of the light fixture 100. The cavity 120, particularly the surface or inner surface of the cavity 120, is at least partially bounded by the movable lens 170. The cavity is further at least partially bounded by the sealing element 111 on an inner side of the cavity. The cavity is open to the exterior on the light output side.

By attaching the membrane 111 to the lens 107 at the first end 118, and to the sidewall 125 of at the second end, it is possible to seal an opening (not shown) along on outer periphery of the lens 107 to thereby avoid the ingress of dust, particles, moisture, or liquid and/or contaminants into the first compartment 140 along this periphery. It is consequently possible to avoid the use of an extra sealing window, which, in conventional light fixtures is typically arranged in front of the lens 107 at a distance thereto, such as close to the free end or recess of the sidewall 125.

Two motors 105, 106 are arranged for movement of the head 102. The motor 106 rotates the yoke relative to the base 104 and thus also rotates the head 102, and the motor 105 tilts the head 102.

An external computer 200 is in communication with a control unit 112 integrated in the base 104. The control unit 112 is arranged to control movement of the lens 107, to control the at least one light source 110, to control movement the head 102, to control movement of the yoke 103, and/or the like.

The base 104 can further comprises a user input element not shown by which a user of the light fixture can also control the light fixture. The user input element can comprise one or more buttons, one or more touch pads, a keyboard, and/or the like. Additionally, the base 104 can include as orientation sensor 116 which is able to determine an orientation of the base, the yoke and the head in space, especially relative to a vertical axis relative to the earth, which in the situation shown corresponds to the Y axis.

As discussed in connection with FIGS. 1 to 8, the lens 107 is the last optical element in the light path when the light generated by the light source 110 exits the light fixture 100 through the cavity 120, as the cavity is not closed by a transparent window. No protective cover is provided at the height of the upper end of the sidewalls 125 so that in dependence on the position of the lens 107 a smaller or larger recess or cavity 120 is generated at the front end of the light source where the light exits the light fixture.

The light fixture 100, as shown in FIGS. 1 to 8, further includes a drainage element 400 extending from the cavity 120 through the housing sidewall 125 for draining accumulated liquid from the cavity 120.

In these examples, the drainage element 400 is realized as a drainage tube extending from an inlet 401 in the cavity through the housing sidewall 125 to the exterior of the light fixture 100. However, it will be understood that any form and material of a drainage element may be used, which channels fluid through the housing sidewall. The drainage element 400 seals the inner space from the evacuated liquid from the cavity 120, it allows the liquid to flow from the cavity 120 through the light fixture housing, specifically the housing sidewall 125 and/or through the sealed inner space 140, into the exterior of the light fixture, while preventing ingress of the liquid into the sealed inner space 140.

The drainage element 400 further comprises a drainage inlet 401. The drainage inlet 401 is positioned in the cavity to receive accumulated liquid. The drainage element 400 further comprises a drainage outlet 402. The drainage outlet 402 is positioned in the housing sidewall 125, or more generally in the light fixture housing, to discharge the accumulated liquid 300, wherein the drainage element 400 has a first end coupled to the drainage inlet 401 and a second end coupled to the drainage outlet 402.

In the described examples, the sealing element 111 has the shape of a deformable tubular membrane, the tubular shape extending from a first end of the deformable membrane 111 to a second end of the deformable membrane 111, wherein the first end of the deformable membrane 111 is attached to the movable lens 107 around a circumferential edge of the movable lens 107, and a second end of the sealing element is attached to the housing sidewall 125 around a perimeter of the housing sidewall 125.

Figure 3:
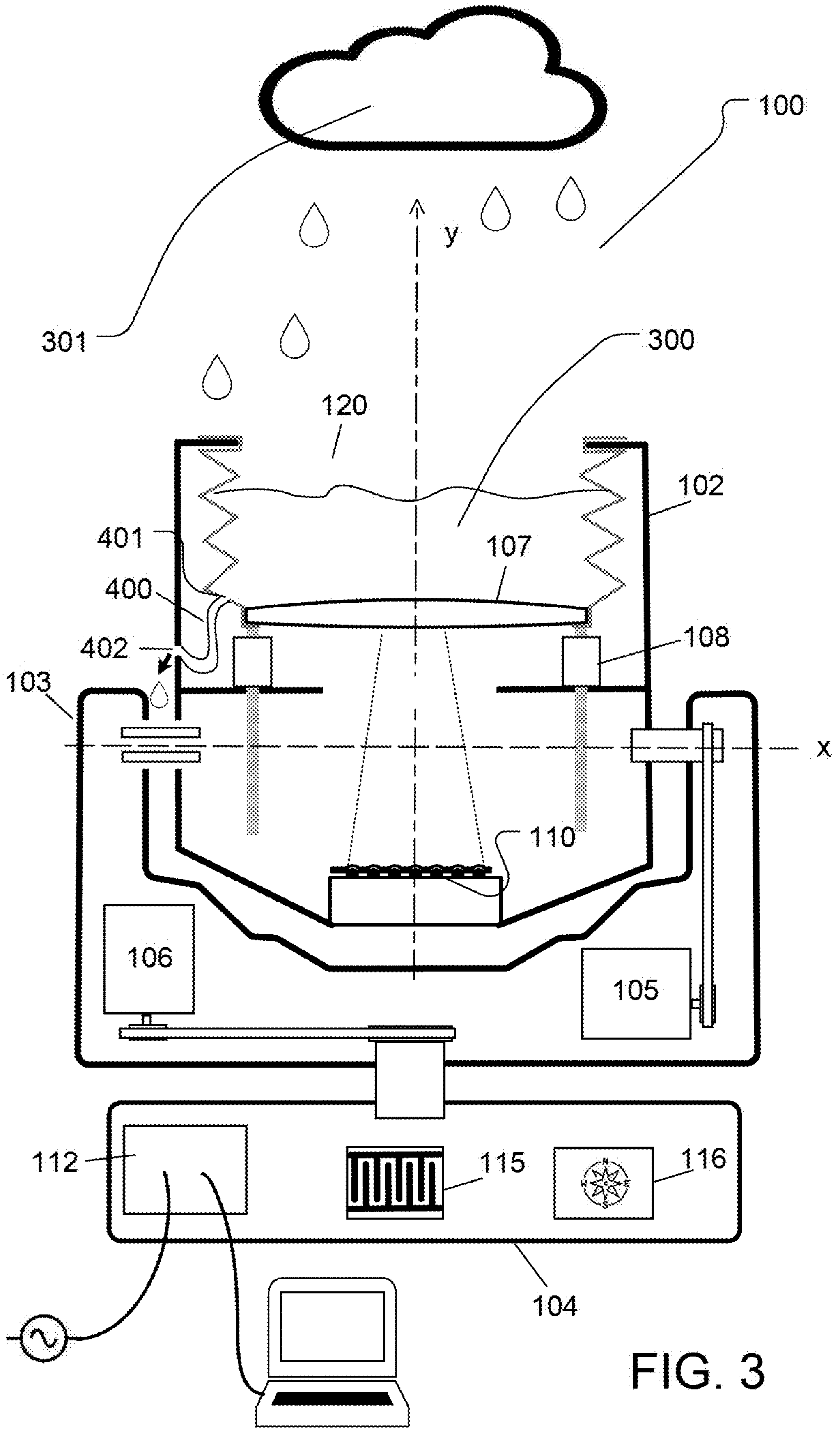
FIG. 3 schematically illustrates a cross-sectional view of the light fixture of FIG. 1 with the movable lens arranged in a back position, wherein liquid is removed from the cavity in front of the movable lens, according to various embodiments.

FIG. 3 schematically illustrates a cross-sectional view of the light fixture 100 of FIG. 1 with the movable lens 107 in a back position, wherein liquid 300 is removed from the cavity 120 in front of the movable lens 107, according to various embodiments.

As shown in connection with FIG. 3, it is possible that liquid 300 from rain 301 is collected in the recess 120 when the recess and the main light emission direction has a certain angle relative to vertical axis, axis Y in FIG. 3. Accordingly the tilt angle determines and influences whether and how much liquid 300 is collected in the recess 120 in case of rain. It is clear that the liquid 300 as shown in FIG. 3 will negatively influence the emitted light beam and might deteriorate the components involved.

In the examples of FIGS. 1 to 4, 7 and 8, the second end 119 of the sealing element 111 is attached to the housing sidewall 125 on the light output side of the lens 107. Therefore, the tubular shape of the sealing element 111 forms an inner space, which may be referred to as cavity 120 or form at least part of the cavity 120, in which the liquid 300 can accumulate. The inner space is closed by the lens on an inner side of the inner space and is open to the exterior on the light output side. In various examples, the cavity 120 in the housing is at least partly formed by the inner space of the sealing element 111.

In these examples, the drainage element 400 comprises a moving end and a fixed end. The moving end of the drainage element is coupled to the movable lens and moves with the movable lens, and the fixed end of the drainage element is coupled and fixed to the housing. In various examples, the moving end may be coupled to the first end of the sealing element 111, such that it can receive accumulated liquid from the cavity 120. In other words, the moving end of drainage element 400 and/or the drainage inlet 401 is positioned adjacent to the movable lens in the sealing element and configured to move with the movable lens.

Figure 4:
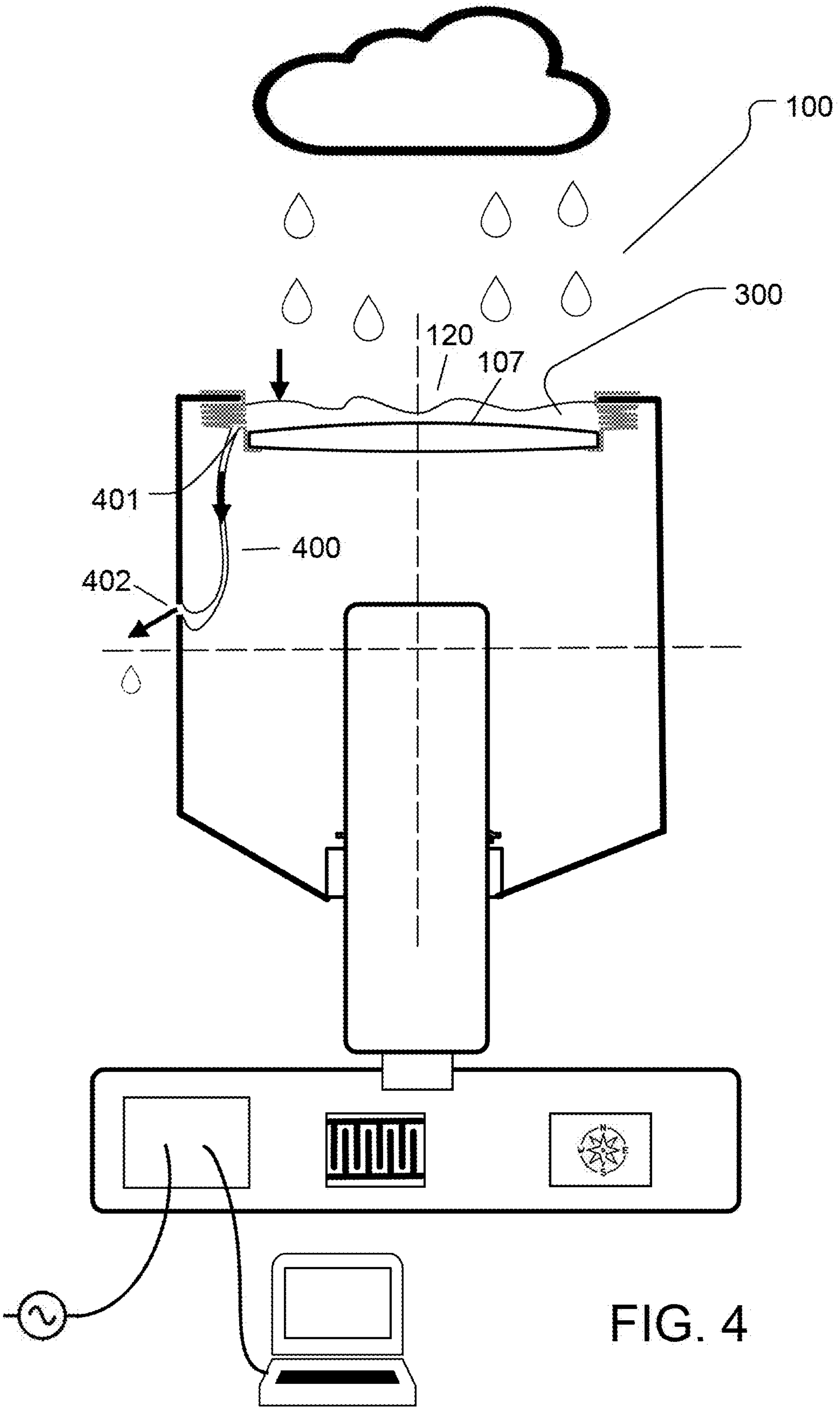
FIG. 4 schematically illustrates a cross-sectional view of the light fixture of FIG. 2 with the movable lens in the front position, wherein liquid is removed from the cavity in front of the movable lens, according to various examples.

FIG. 4 schematically illustrates a cross-sectional view of the light fixture 100 of FIG. 2 with the movable lens 107 in a front position, wherein liquid is removed from the cavity in front of the movable lens, according to various examples.

As can be seen in FIG. 4, when the movable lens 107 moves away from the light sources 110, into a front position of the movable lens 107, and also when rested in the front position, liquid 300 may be evacuated from the cavity through the drainage element 400. The drainage inlet 401 is positioned higher than the drainage outlet 402, such that the drainage through drainage element 400 is facilitated.

Figure 5:
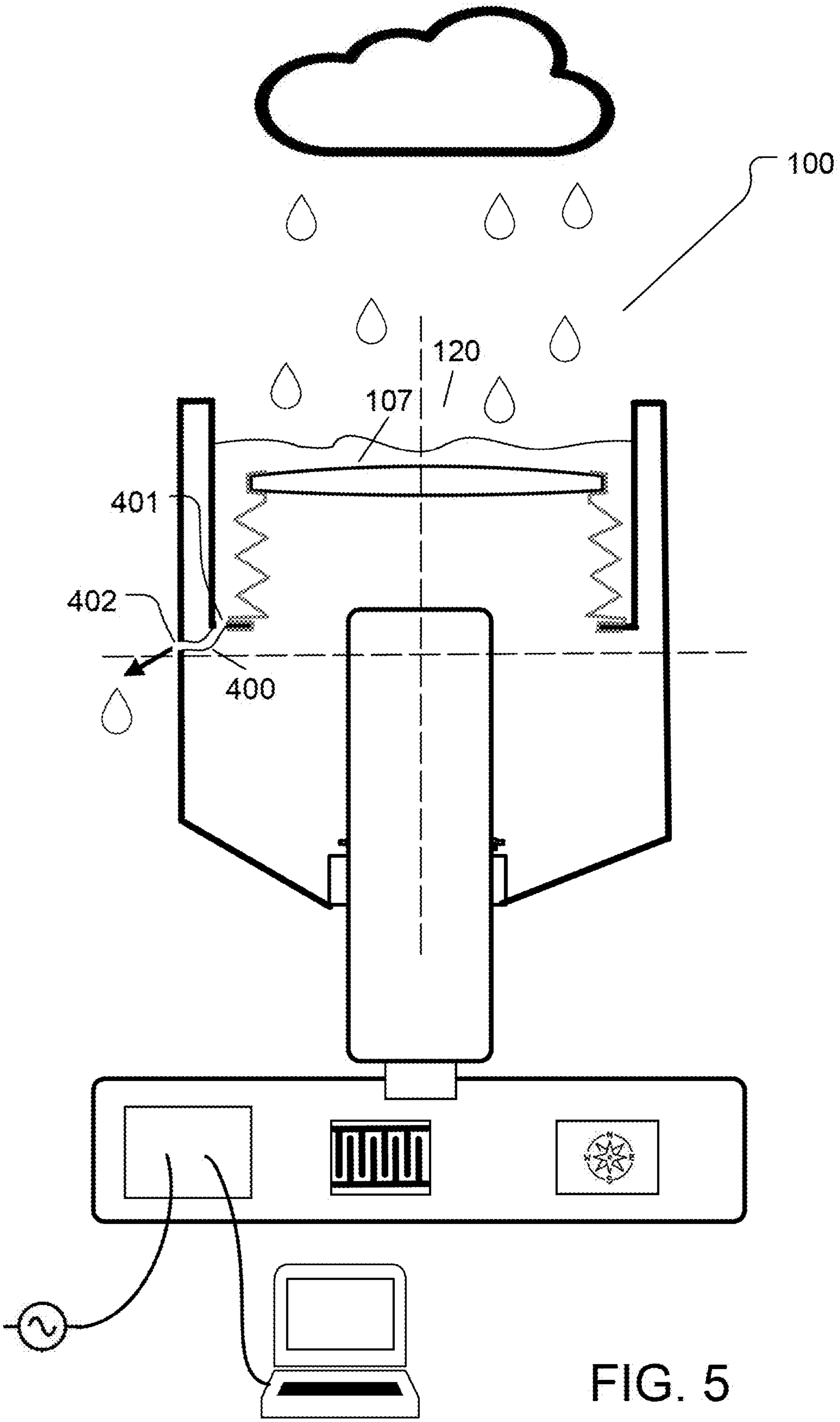
FIG. 5 schematically illustrates a cross-sectional view of a further light fixture including a sealing element attached to the housing on the light receiving side of the movable lens and a drainage element, according to various embodiments.
Figure 6:
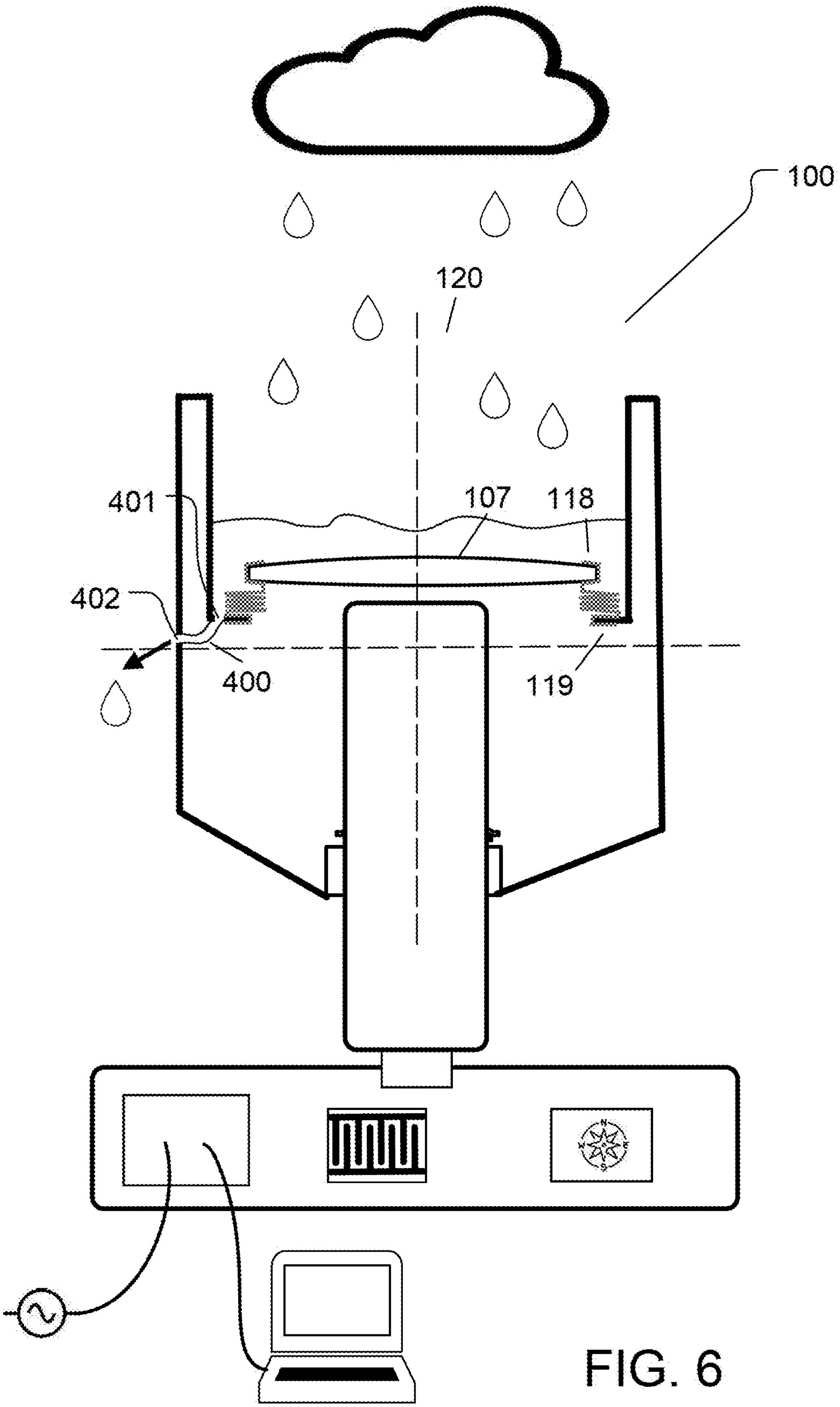
FIG. 6 schematically illustrates a cross-sectional view of the light fixture of FIG. 5 with the movable lens in a back position, wherein liquid is removed from the cavity in front of the movable lens, according to various embodiments.

FIGS. 5 and 6 schematically illustrates a cross-sectional view of a further light fixture 100, wherein the sealing element 111 is attached to the housing on the light receiving side of the movable lens 107, according to various embodiments.

In these examples, the sealing element 111 is attached with its second end 119 to the housing at the bottom of the cavity 120, on the light receiving side of the movable lens 107. Therefore, the sealing element will be extended, when the movable lens is in a front position and drawn back or folded, when the lens 107 is in a back position.

When the second end of the sealing element is attached to the housing sidewall on the light receiving side of the lens, it can be attached in an area below the lens 107, or close to the light sources 110, in other words between the movable lens 107 and the light source 110, with regard to movement of the lens 107 along its axial direction. The housing sidewall 125 extends circumferentially along the sealing element 111 and partly bounds the cavity 120. In other words, the cavity 120 is at least formed by an inner tubular space between the housing sidewall 125 and a circumferential surface of the sealing element 111. The draining inlet 401 is positioned at the bottom of the cavity in the housing sidewall, particularly a rim extending to the interior direction from the housing sidewall and forming a bottom surface of the cavity 120. The drainage outlet 402 may be positioned in the housing side wall as in the other FIGS. 1-8.

FIG. 6 schematically illustrates a cross-sectional view of the light fixture 100 of FIG. 5 with the movable lens 107 in a back position closer to the bottom rim of the housing sidewall 125, wherein liquid is removed from the cavity in front of the movable lens, according to various embodiments.

As can be seen in FIG. 6, when the sealing element 111 is in a folded or drawn back position, the accumulated liquid can flow through drainage inlet 401 through drainage element 400 and drainage outlet 402 into the exterior of the light fixture.

It is to be understood, that any described aspects of the light fixture and the drainage elements may be applied in any other examples, and in particular may be applied regardless of the position at which the sealing element is attached to the housing with its second end 119, which may be on the light output side or the light receiving side of the movable lens.

Figure 7:
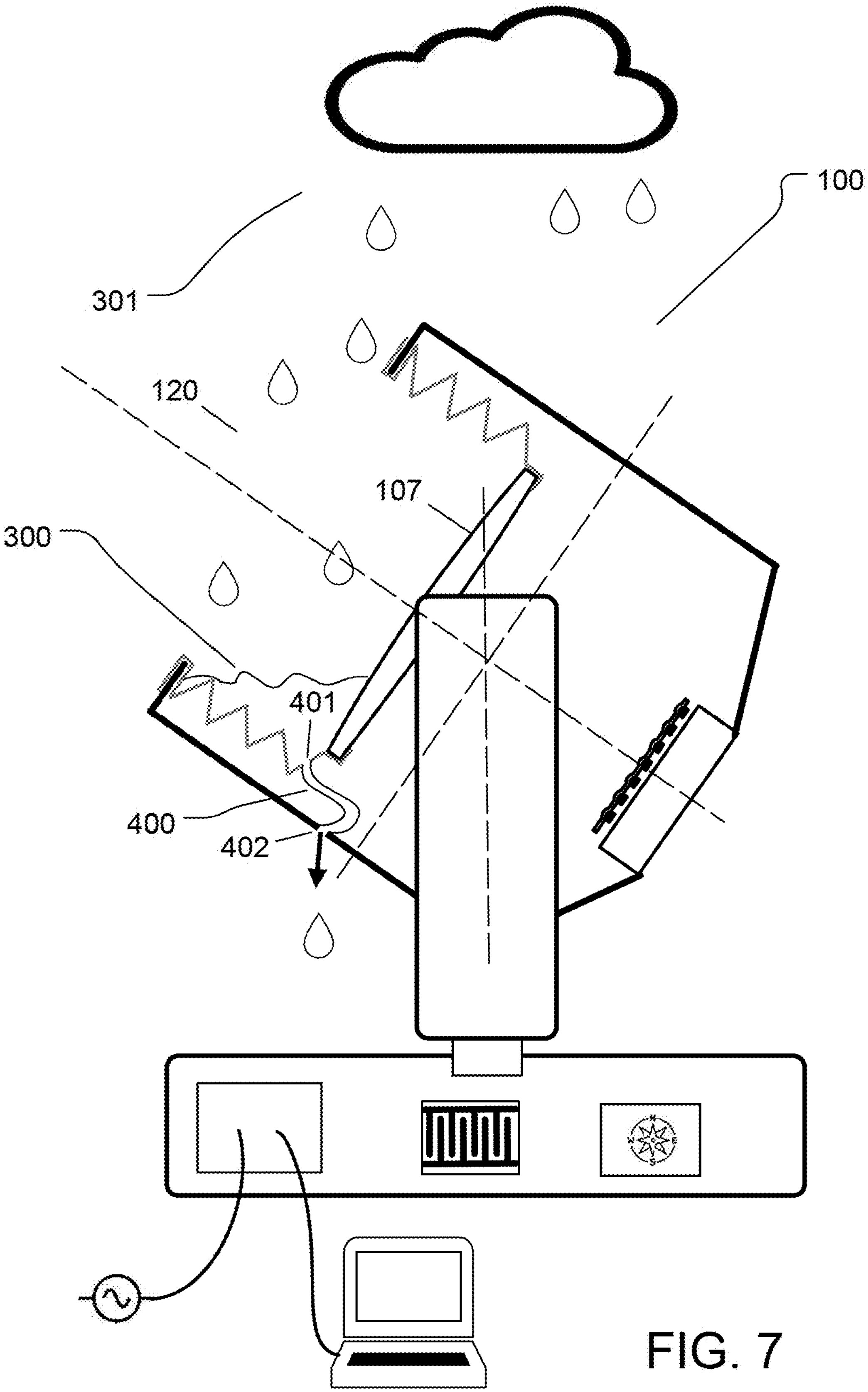
FIG. 7 schematically illustrates a cross-sectional view of the light fixture of FIGS. 1-4 in a tilted orientation, wherein liquid is removed from the cavity in front of the movable lens, according to various embodiments.

FIG. 7 schematically illustrates a cross-sectional view of the light fixture 100 of FIGS. 1-4 in a tilted orientation, wherein liquid is removed from the cavity 120 in front of the movable lens 107, according to various embodiments.

As can be seen in FIG. 7, the drainage inlet is positioned on an inner bottom surface of the cavity, more general in an inner half of the cavity, such that it is positioned at a lower position of the cavity where the liquid is collected. From the lower position, the liquid flows to the exterior of the light fixture 100.

In the described examples, wherein the light fixture is a moving head light fixture, the inner space of the housing is located within the head of the moving head light fixture, and the movable lens is a zoom lens, which is the last optical element along the light path of the light fixture.

The light fixture 100 comprises a longitudinal optical axis extending through the housing sidewall and the movable lens, and a tilt rotational axis, perpendicular to the longitudinal axis, extending through the head. The drainage element is positioned on the housing sidewall, such that it will be in a lower or bottom region of the cavity in tilted orientation, in other words, it may be arranged on a plane (or within a predetermined distance from it), which includes the longitudinal axis and is perpendicular to the rotational axis.

In such a way, the drainage element extends through the sealed inner space of the housing, and liquid may flow through a tube or channel surrounded by the inner sealed space of the housing, for draining the liquid from the cavity, while keeping the inner space sealed from the liquid.

Figure 8:
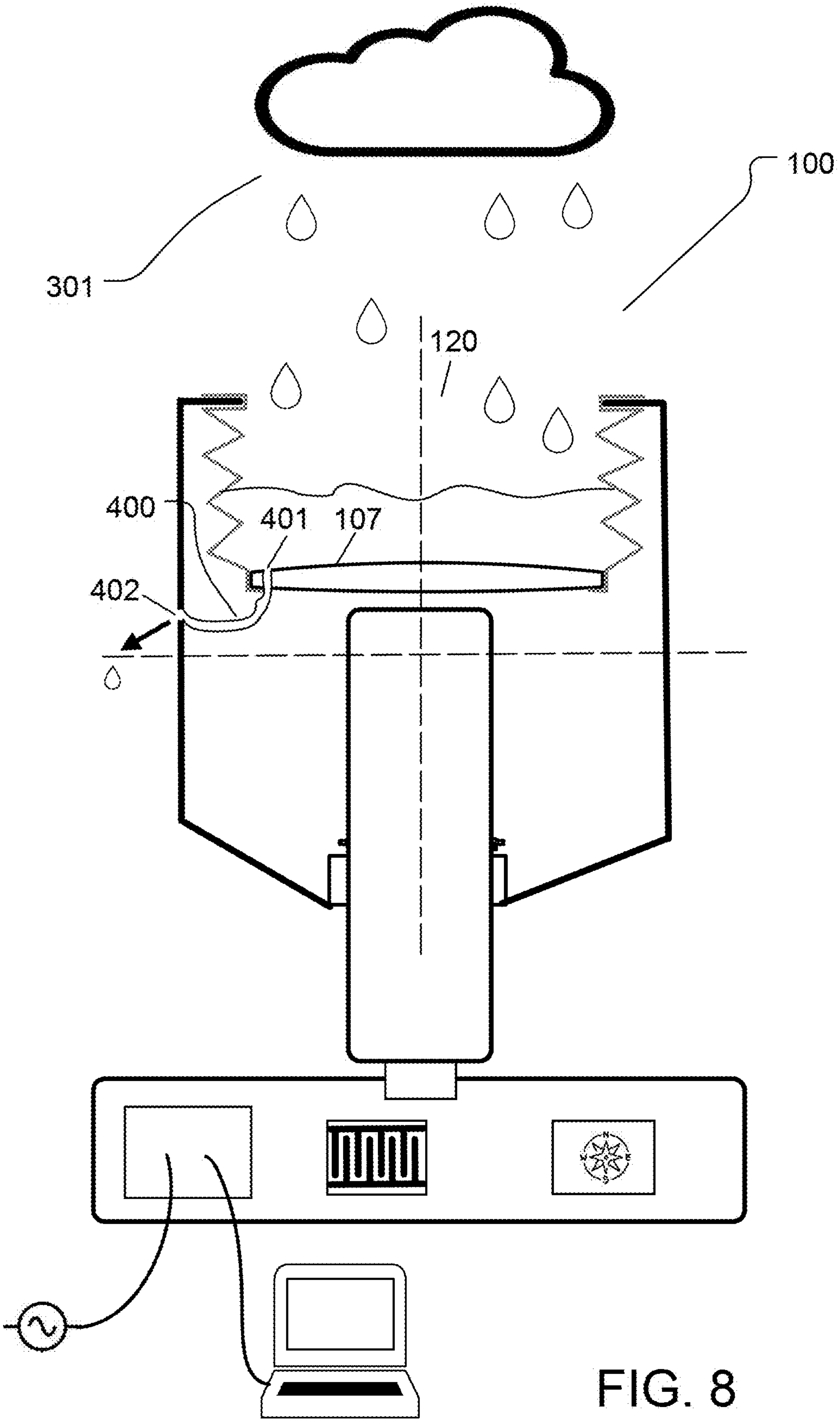
FIG. 8 schematically illustrates a cross-sectional view of a further light fixture, wherein the drainage inlet is positioned in the movable lens, according to various embodiments.

FIG. 8 schematically illustrates a cross-sectional view of a further light fixture, wherein the drainage inlet is positioned in the movable lens, according to various embodiments.

It will be understood that the drainage element, specifically the drainage inlet may be formed in any configuration as a separate part of the sealing element 111, or it may be combined with the sealing element 111.

In the example of FIG. 8, the drainage inlet 401 is integrated directly into the movable lens 107. In other embodiments, it may located at the same axial position as the lens, or within a predetermined distance from the lens in the cavity 120. This arrangement allows any accumulated liquid 300 to enter the drainage element 400 directly from the surface of the lens 107 itself. The drainage inlet 401, being positioned in the lens 107, moves together with the lens as it is adjusted along the housing sidewall 125.

By incorporating the drainage inlet 401 into the movable lens 107, the accumulated liquid 300 can be efficiently captured and channeled into the drainage element 400. This design ensures that the drainage system effectively regardless of the position of the lens 107, as the drainage inlet 401 is located at point of the cavity 120 where the liquid 300 influences the optical properties of the lens 107.

From the above said, various general conclusions may be drawn:

The drainage element may comprise a drainage tube, also referred to as drainage channel. The drainage element, in particular the drainage tube, may extend from the cavity through the housing sidewall to the exterior of the light fixture. The drainage element may provide a conduit for accumulated liquid from the cavity to the outside (exterior) of the housing. The drainage element may comprise a drainage passage that traverses the circumferential sidewall for evacuation of fluid from the cavity to the external environment. The drainage element may extend at least partially through the sealed inner space of the housing.

The at least one drainage element may include a drainage inlet positioned in the cavity to receive the accumulated liquid and a drainage outlet positioned in the housing sidewall to discharge the accumulated liquid. The drainage inlet serves as an entry point for the accumulated liquid within the cavity, while the drainage outlet acts as an exit point on the housing sidewall, to be evacuated from the light fixture. The drainage tube may have a first end coupled to the drainage inlet and a second end coupled to the drainage outlet. This configuration enables the drainage tube to effectively transfer the accumulated liquid from the cavity to the exterior of the light fixture. In other words, the drainage passage may have an intake port (drainage inlet) situated within the cavity to collect the accumulated fluids and a discharge port (drainage outlet) located on the circumferential sidewall to release the fluids, with the drainage passage connecting the intake port to the discharge port.

The drainage element, specifically the drainage inlet may be located within the cavity close to a bottom surface of the cavity. Specifically within a predetermined axial distance from the movable lens. For example, the movable lens may have an axial position with regard to the longitudinal axis through the center of the light sources and the center of the movable lens, wherein the center position of the drainage inlet may be closer than 50% of the diameter of the movable lens, or closer than 30%, or 20%, or 10% or 5%, from the axial position of the movable lens. In other embodiments the drainage inlet may be positioned closer than the above distances from the innermost location of the cavity, such that it can be considered part of the bottom surface of the cavity close to the movable lens.

In various examples, the drainage outlet may be located closer to the light sources than the movable lens, in particular when the lens is arranged in an innermost position of the movable lens in the light fixture.

The sealing element may comprise a deformable membrane having a tubular shape extending from a first end of the deformable membrane to a second end of the deformable membrane. This deformable membrane, which can be made of flexible materials such as rubber or silicone, serves to create a seal between the movable lens and the housing sidewall. The first end, or opening, of the deformable membrane may be attached to the movable lens around a circumferential edge of the movable lens. In various examples, the second end, or opening, of the sealing element may be attached to the housing sidewall around a perimeter of the housing sidewall. This arrangement allows the deformable membrane to maintain a seal while accommodating the movement of the lens along the housing sidewall. Alternatively, the sealing element may consist of a foldable barrier with a cylindrical form, spanning from one end to the other, for creating a seal between the movable lens and the circumferential sidewall.

The second end of the sealing element may be attached to the housing sidewall on the light output side of the lens. By securing the second end of the sealing element to the housing sidewall on the same side as the light output, the sealing element can effectively seal the cavity formed by the movement of the lens. This configuration ensures that the sealing element maintains a seal while the lens is adjusted along the housing sidewall. In other words, the end of the sealing element opposite to the end attached to the adjustable lens may be affixed to the circumferential sidewall on the light emission side, ensuring a robust seal for the cavity created by the lens movement.

The tubular shape of the sealing element may form an inner space, wherein the inner space is closed by the lens on an inner side of the inner space and is open to the exterior on the light output side. In this configuration, the cavity in the housing is formed by the inner space of the sealing element. The elongated, for example cylindrical, form of the sealing element creates an enclosed volume, with the adjustable lens sealing the interior side of this volume and the light emission side remaining exposed to the external environment, thereby defining the cavity within the housing enclosure.

The at least one drainage element may comprise a moving end and a fixed end, wherein the moving end of the drainage element, e.g. of the drainage tube, is coupled to the movable lens and the fixed end of the drainage element is coupled to the housing, especially a circumferential outer surface of the housing, or a bottom surface of the housing. This arrangement allows the drainage tube to maintain its connection to the lens while accommodating the lens movement. The moving end of the drainage tube follows the lens as it is adjusted, while the fixed end remains attached to the housing.

The drainage inlet may be positioned adjacent, for example directly adjacent, to the movable lens in the sealing element and configured to move with the movable lens. For example, the inlet may have the same axial position as the movable lens, or the inlet and the lens may overlap each other in axial direction. For example, the lens forms a bottom surface of the cavity, and the inlet at least partly is at the same axial position as the bottom surface. Or the drainage inlet may be arranged within a predetermined distance from the axial position of the lens along the movement axis of the movable lens, e.g. less than the lens thickness, or less than 50% of lens thickness along axial direction. By placing the drainage inlet close to the movable lens within the sealing element, the inlet can effectively capture any accumulated liquid near the lens. As the lens moves, the drainage inlet moves along with it, ensuring that it remains in an optimal position at the cavity bottom to collect the liquid. In other words, the intake port of the drainage passage may be situated in close proximity to the adjustable lens within the sealing element forming the bottom surface of the cavity, allowing it to shift with the lens and efficiently gather accumulated fluid.

The drainage inlet may be positioned in and/or extend through the movable lens. In this configuration, the drainage inlet is integrated into the lens itself, providing a direct path for the accumulated liquid to enter the drainage tube. This arrangement ensures that the liquid is efficiently captured and channeled into the drainage system. Alternatively, the intake port of the drainage passage may traverse the adjustable lens, creating a seamless conduit for the accumulated fluids to flow into the drainage element.

The second end of the sealing element may be attached to the housing sidewall on the light receiving side of the lens, wherein the housing sidewall extends circumferentially along the sealing element and partly bounds the cavity. In this configuration, the sealing element is attached to the housing sidewall on the side opposite the light output side, and the housing sidewall itself forms part of the boundary of the cavity. This arrangement allows the sealing element to maintain a seal while the cavity is partially enclosed by the housing sidewall and the sealing element. A bottom surface of the cavity may be formed by the housing and or the sealing element on the light receiving side of the movable lens. The end of the sealing element opposite to the end attached to the adjustable lens may be affixed to a rim extending from the circumferential sidewall on the side where light enters the lens, with the sidewall extending along the sealing component and partially defining the cavity.

The draining inlet may be positioned in a surface of the housing sidewall that bounds the cavity. By placing the draining inlet directly on the housing sidewall surface that forms part of the cavity boundary, the inlet can efficiently capture any accumulated liquid within the cavity. This configuration ensures that the liquid is effectively collected and directed into the drainage system. In other words, the intake port of the drainage passage may be situated on the portion of the circumferential sidewall that partially defines the cavity, allowing to gather accumulated fluids within the cavity in a tilted orientation of the light fixture.

The drainage inlet may be positioned in an inner half of the cavity, in particular on an inner sidewall or the bottom surface of the cavity. By locating the drainage inlet in the inner half of the cavity, especially on the bottom surface, it can effectively capture any accumulated liquid that settles at the lowest point of the cavity. This positioning ensures that the liquid is efficiently collected and drained from the cavity. The intake port of the drainage passage may be situated within the interior half of the cavity, particularly on the lowermost surface within the cavity closest to the at least one light source, to optimally collect accumulated fluids.

The at least one drainage element may be formed as separate part from the sealing element. In this configuration, the drainage element is a distinct component from the sealing element, allowing for greater flexibility in the design and placement of the drainage system. The drainage element can be positioned and routed independently of the sealing element, ensuring optimal performance of both components. In other words, the drainage component may be a standalone part, distinct from the sealing component.

The at least one drainage element may be integrally molded with the sealing element. In this configuration, the drainage element may be fabricated as a single, unified component with the sealing element. This integrated design simplifies the manufacturing process and ensures a seamless connection between the drainage element and the sealing element. The drainage component may be fabricated as a monolithic structure with the sealing component.

The drainage outlet may be positioned on a side surface of the light fixture housing. In this configuration, the drainage outlet, which serves as the exit point for the accumulated liquid, is located on a side surface of the light fixture housing. This placement allows the liquid to be discharged from the light fixture efficiently, without interfering with the light output or other components. By situating the discharge port of the drainage passage on a lateral surface of the housing enclosure, the accumulated fluids can be effectively released from the light fixture.

The drainage element, which facilitates the removal of accumulated liquid from the cavity, may be designed as an elastic tube or a bellows. These flexible components can accommodate the movement of the lens while maintaining a secure connection between the drainage inlet and outlet. An elastic tube, made of materials such as rubber or silicone, can stretch to accommodate lens movement. A bellows, with its foldable structure, can expand and contract to adapt to the lens position. The drainage element may comprise a resilient hose or a collapsible, pleated structure to ensure sealed connection between the intake and discharge ports while allowing for lens adjustments.

The light fixture can be designed as a moving head light fixture, commonly used in entertainment and stage lighting applications. The housing enclosure, which contains the light source(s) and movable lens, is comprised within the movable head of the fixture. The adjustable lens, positioned as the final optical element along the light path, may comprise as a zoom lens, allowing for variable beam angles and focusing capabilities. The sealed internal cavity of the housing may be situated inside the head of the moving head light fixture, with the adjustable zoom lens being the last optical component in the light fixture's optical path of the head.

In various examples related to moving head light fixtures, the fixture comprises a longitudinal optical axis that passes through both the housing sidewall and the adjustable lens. This longitudinal lens axis represents the central path along which light travels through the fixture. Additionally, the moving head includes a tilt rotational axis, which allows the head to rotate and aim the light output in different directions. The drainage element can be positioned on the housing sidewall in relation to the tilt axis, such that the inlet is in the lowest position in the cavity when the heat is tilted. In other words, the drainage inlet may be located in a plane that includes the longitudinal optical axis and is perpendicular to the tilt rotational axis. This placement ensures that the drainage element remains at the lowest point of the cavity when the head is tilted, enabling effective liquid collection and removal.

The drainage element may be constructed using an elastic material, such as rubber or silicone. These materials provide the necessary flexibility to accommodate the movement of the lens while maintaining a reliable seal and connection. The elasticity of rubber or silicone allows the drainage tube to stretch and bend as needed, ensuring that it remains connected to both the drainage inlet and outlet throughout the lens adjustment range.

The drainage element, particularly the drainage tube, may pass through the sealed internal cavity of the housing. In other words, the fluid may flow in the drainage element through the inner compartment, in which also the light sources are included. This configuration allows the drainage tube to connect the cavity formed by the adjustable lens and sealing element to the exterior of the light fixture, thus allowing a drainage path not within the optical path of the moving lens, i.e., in a direction towards the at least one light source and in a direction away from the longitudinal axis. By routing the drainage tube through the sealed inner space, the accumulated liquid can be effectively removed from the cavity without compromising the protection of the internal components from external elements such as moisture and dust. The drainage component, specifically the drainage passage, may traverse the sealed interior of the housing to provide an effective path for evacuating fluids from the cavity while preserving the housing's sealed integrity.

The lens may be arranged substantially perpendicular to the at least one light source. The movement of the lens relative to the at least one light source may be a substantially linear movement in a direction away from or towards the at least one light source. The sidewall may extend in the direction away from or towards the at least one light source.

A length of the sealing element, also referred to as membrane, may extend from the first end to the second end. The length may vary with movement of the lens. The length may vary up to 300 mm with the movement of the lens. The membrane may comprise a bellows. A diameter of the membrane may be between 100 mm and 500 mm. A material thickness of the membrane may be between 0.5 and 3.0 mm. The membrane may be made from a material selected from a group consisting of rubber, ethylene propylene diene monomer (EPDM), an elastomer, silicone, polytetrafluoroethylene (PTFE), polyoxymethylene (POM), and aluminum.

The side of the light fixture, to which the cavity is open to, may be referred to as the light output side. The light output side may refer to a hemisphere, i.e. the side, to which the movable lens projects the light to, for example through the cavity. The light receiving side may refer to a hemisphere, i.e. the side of the lens from which the lens receives the light from the light sources.

The membrane at the first end may comprise an edge portion extending toward the inner cavity and terminating in a free end. The lens may be attached to the membrane along the edge portion. A plurality of apertures may be formed in the edge portion for attachment of the lens.

The membrane at the second end may comprise an outwardly projecting wall portion forming a collar circumferentially around the membrane. The projecting wall portion may extend outwardly from the tubular shape and may terminate in a free edge outside the inner cavity. An end portion of the sidewall may be arranged in the collar to attach the second end to the sidewall.

The seal may provide an ingress protection rating of IP X4 or higher, as defined in standard IEC 60529. The Ingress Protection (IP) rating system classifies the degree of protection against solid objects and water provided by mechanical casings and electrical enclosures. An IP X4 rating signifies that a product is protected against water splashes from any direction. Higher ratings include for example IP X5, IP X6, IP X7, and IP X8 certifying protection during continuous immersion in water. Thus the disclosed techniques can provide an effective barrier against the ingress of water and other contaminants, protecting the interior of the enclosure and the electronic components housed therein.

Summarizing, the disclosed drainage techniques provide an improved mechanism for removing accumulated liquid from the cavity formed by the movable lens and its corresponding sealing element. By incorporating one or more drainage elements that extend from the cavity through the housing sidewall, it is ensured that liquid accumulated in the cavity can be efficiently drained to the exterior through the light fixture housing. The disclosed techniques are particularly advantageous in outdoor light fixtures, for example moving head light fixtures, where the adjustable lens and the tilt capabilities of the fixture to upwards direction can result in liquid accumulation within the cavity. The disclosed light fixture with its integrated drainage system offers a reliable and efficient solution for managing accumulated liquid in the cavity formed by the movable lens. By effectively removing the accumulated liquid, the system prevents any negative impact on the optical quality, protects the internal components, and ensures optimal operation of the light fixture in various applications.

While the systems, components, and methods described herein have been illustrated in the context of a moving head light fixture, it should be understood that the application of the described techniques and configurations is not so limited. For example, the described techniques may be applied to another light fixture, where the last optical element is non-movable and positioned in a cavity. The principles and innovations are also applicable to a variety of electronic equipment enclosures where liquid-tight drainage is needed. These may include, but are not limited to, outdoor electronic systems, marine electronics, aerospace and avionics equipment, data center hardware, laboratory instruments, medical devices, and telecommunications equipment, among others, which comprise movable or non-movable elements sealed by at least one sealing element in a cavity of a housing and can be disturbed by accumulated liquid.

The description and figures are merely illustrative and do not limit the scope of the claims to any particular implementation or use. Although the disclosed techniques have been described with respect to certain preferred embodiments, equivalents and modifications will occur to others skilled in the art upon the reading and understanding of the specification. The present disclosure includes all such equivalents and modifications and is limited only by the scope of the appended claims.

What is claimed is:

1. A light fixture comprising:

a light fixture housing with a housing sidewall extending circumferentially around a movable lens, the light fixture housing forming an inner space including at least one light source for emitting light through the movable lens;

the movable lens arranged on a light output side of the light fixture housing and movable along the housing sidewall relative to the at least one light source;

a sealing element between the housing sidewall and the movable lens, wherein:

the sealing element seals the inner space from an exterior outside the light fixture, and movement of the movable lens modifies a volume of a cavity formed in the housing on the light output side, the cavity being at least partially bounded by the movable lens and the sealing element on an inner side of the cavity and open to the exterior on the light output side; and at least one drainage element extending from the cavity through the housing sidewall for draining accumulated liquid from the cavity.

2. The light fixture of claim 1, wherein the at least one drainage element comprises a drainage tube extending from the cavity through the housing sidewall to the exterior of the light fixture, wherein the drainage tube provides a flow channel for the accumulated liquid.

3. The light fixture of claim 1, wherein the at least one drainage element comprises a drainage inlet positioned in the cavity to receive the accumulated liquid and a drainage outlet positioned in the housing sidewall to discharge the accumulated liquid, wherein the drainage element has a first end coupled to the drainage inlet and a second end coupled to the drainage outlet.

4. The light fixture of claim 3, wherein the drainage inlet is positioned adjacent to the movable lens in the sealing element and configured to move with the movable lens.

5. The light fixture of claim 3, wherein the drainage inlet extends through the movable lens.

6. The light fixture of claim 3, wherein the sealing element comprises a deformable membrane having a tubular shape extending from a first end of the deformable membrane to a second end of the deformable membrane, wherein:

the first end of the sealing element is attached to the movable lens around a circumferential edge of the movable lens, and a second end of the deformable membrane is attached to the housing sidewall.

7. The light fixture of claim 6, wherein the second end of the sealing element is attached to the housing sidewall on the light output side of the movable lens.

8. The light fixture of claim 6 wherein the tubular shape of the sealing element forms an inner space, wherein the inner space is closed by the movable lens on an inner side of the inner space and is open to the exterior on the light output side, and wherein the cavity in the housing is formed by the inner space of the sealing element.

9. The light fixture of claim 1, wherein the at least one drainage element comprises a moving end and a fixed end, wherein the moving end of the drainage element is coupled to the movable lens and the fixed end of the drainage element is coupled to the housing.

10. The light fixture of claim 1, wherein a second end of the sealing element is attached to the housing sidewall on a light receiving side of the movable lens, wherein the housing sidewall extends circumferentially along the sealing element and partly bounds the cavity.

11. The light fixture of claim 1, wherein a drainage inlet of the at least one drainage element is positioned at a surface of the cavity.

12. The light fixture of claim 11, wherein the drainage inlet is positioned in an inner half of the cavity on an bottom surface of the cavity.

13. The light fixture of claim 12, wherein the at least one drainage element is formed as a separate part from the sealing element.

14. The light fixture of claim 12, wherein the at least one drainage element is integrally molded with the sealing element.

15. The light fixture of claim 1, wherein the at least one drainage element is positioned on a side surface of the light fixture housing.

16. The light fixture of claim 1, wherein the at least one drainage element comprises an elastic tube and/or a foldable bellows.

17. The light fixture of claim 1, wherein the light fixture is a moving head light fixture, wherein the inner space is within a head of the moving head light fixture, wherein the movable lens is a zoom lens, which is a last optical element along a light path of the light fixture.

18. The light fixture of claim 17, wherein the light fixture comprises a longitudinal optical axis extending through the housing sidewall and a center of the movable lens, and a tilt rotational axis extending through the head, and wherein the at least one drainage element is positioned in the cavity on a plane, which includes the longitudinal optical axis and is perpendicular to the tilt rotational axis.

19. The light fixture of claim 1, wherein the at least one drainage element is made of an elastic material.

20. The light fixture of claim 1, wherein the drainage element extends through the inner space of the housing.

* * * * *